United States Patent
Kleber

(10) Patent No.: US 7,861,832 B2
(45) Date of Patent: Jan. 4, 2011

(54) THERMALLY ACCOMMODATING INTERCONNECTION FOR CAST-IN-PLACE COMPONENTS

(75) Inventor: Richard M. Kleber, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 130 days.

(21) Appl. No.: 12/209,457

(22) Filed: Sep. 12, 2008

(65) Prior Publication Data

US 2010/0065388 A1    Mar. 18, 2010

(51) Int. Cl.
*F16D 65/12* (2006.01)
(52) U.S. Cl. ............................................. 188/218 XL
(58) Field of Classification Search ............... 188/17, 188/18 A, 218 A, 218 R, 218 XL, 264 A, 188/264 AA; 29/527.5, 598
See application file for complete search history.

(56) References Cited

U.S. PATENT DOCUMENTS

| | | | | |
|---|---|---|---|---|
| 4,281,745 | A | * | 8/1981 | Wirth .................... 188/218 XL |
| 5,005,676 | A | * | 4/1991 | Gassiat ................. 188/218 XL |
| 5,862,892 | A | * | 1/1999 | Conley ................. 188/218 XL |
| 6,367,598 | B1 | * | 4/2002 | Sporzynski ........... 188/218 XL |
| 7,219,777 | B2 | * | 5/2007 | Lin ....................... 188/218 XL |
| 7,380,645 | B1 | * | 6/2008 | Ruiz .................... 188/264 AA |
| 7,568,560 | B2 | * | 8/2009 | Lin ....................... 188/218 XL |
| 2007/0119667 | A1 | * | 5/2007 | Hanna et al. .......... 188/218 XL |

OTHER PUBLICATIONS

Richard M. Kleber, U.S. Appl. No. 11/848,732, Aug. 31, 2007, Cast-In-Place Torsion Joint.
Michael D. Hanna, U.S. Appl. No. 11/440,893, May 25, 2006, Rotor Assembly and Method.

* cited by examiner

*Primary Examiner*—Christopher P Schwartz
(74) *Attorney, Agent, or Firm*—Reising Ethington P.C.

(57) ABSTRACT

A first component portion including a first material and that may have a flange. The flange may have one or more ribs located on a surface thereof. A second component portion including a second material that is different from the first material. The second component portion may be cast-in-place over a part of, or substantially all of, the flange and over the ribs. An interconnection is formed between the first and second component portions so that relative movement between the component portions is substantially prevented. Also, thermal expansion and contraction which may occur during use of the first and second component portions is accommodated at the interconnection.

19 Claims, 2 Drawing Sheets

US 7,861,832 B2

THERMALLY ACCOMMODATING INTERCONNECTION FOR CAST-IN-PLACE COMPONENTS

TECHNICAL FIELD

The field to which the disclosure generally relates includes ways to join components of different materials, and ways to accommodate variations in size of the components due to thermal expansion and contraction.

BACKGROUND

Some components have separate portions of different materials that are joined together. The separate portions may be joined by a cast-in-place process in which one portion is cast over the other portion to form a joint thereat. But during use, thermal expansion and contraction could adversely affect the joint such as by permanently deforming the joint or causing a loose fit at the joint.

SUMMARY OF EXEMPLARY EMBODIMENTS OF THE INVENTION

One exemplary embodiment may include a product which itself may include a first component portion and a second component portion. The first component portion may comprise a first material and may have a flange protruding from a body of the first component portion. The flange may terminate at a free end and may taper in height toward the free end. The flange may have one or more ribs that may be located on a surface of the flange. Each of the ribs may be spaced apart from one another on the surface and each of the ribs may taper in height toward the free end and may taper in thickness toward the free end. The second component portion may comprise a second material that is different than the first material. The second component portion may have a portion that is cast-in-place over a part of, or substantially all of, the flange and over the ribs. The cast-in-place process may form an interconnection between the first and second component portions so that relative movement between the first and second component portions is substantially prevented. Thermal expansion and contraction which may occur during use of the first and second component portions is accommodated for at the interconnection.

Another exemplary embodiment may include a product which may include a brake rotor which itself may include a cheek portion and a hub portion. The cheek portion may comprise a first material and the hub portion may comprise a second material that is different than the first material. The cheek portion may have a first flange that extends away from a cheek face of the cheek portion toward an axis of rotation of the brake rotor that is defined during use. The first flange may taper in axial height toward the axis of rotation. The first flange may have one or more ribs that may be located on a surface of the first flange. Each rib may be circumferentially spaced apart from a neighboring rib such that all of the ribs are spaced apart from one another. Each rib may taper in axial height toward the axis of rotation and may taper in circumferential thickness toward the axis of rotation. The hub portion may have a second flange that is cast-in-place over a part of, or substantially all of, the first flange and over the ribs. An interconnection may be formed between the cheek and hub portions at the first and second flanges so that relative movement, such as rotational movement, between the portions is substantially prevented during use. Any thermal expansion and contraction which may occur during use of the brake rotor is accommodated for at the interconnection.

Another exemplary embodiment may include a method of making a product. The method may include providing a cheek portion of a brake rotor. The cheek portion may comprise a first material and may have a first flange that extends away from a cheek face of the cheek portion toward an axis of rotation of the cheek portion that is defined during use of the brake rotor. The first flange may have one or more ribs located on a surface of the first flange, such as an upper and lower surface. Each rib may be circumferentially spaced away from a neighboring rib such that the ribs are circumferentially spaced apart from one another. Each of the ribs may taper in axial height toward the axis of rotation and may taper in circumferential thickness toward the axis of rotation. The method may also include placing the cheek portion in a first cavity of a first molding machine half, and may include bringing the first molding machine half and a second molding machine half together to form a cavity. The method may further include filling the cavity with a molten second material that is different than the first material. When solidified, the second material may form a hub portion of the brake rotor. The hub portion may have a second flange that is formed around a part of, or substantially all of, the first flange and around the ribs. An interconnection may be created between the cheek and hub portions at the first and second flanges so that relative movement, such as rotational movement, between the portions is substantially prevented.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

The figures illustrate a component, such as an exemplary embodiment of an automotive component like a brake rotor 10, that may be made by a cast-in-place process in which a first component portion of a first material is cast-over in part by a second component portion of a second material. The first and second component portions are joined at an interconnection that is designed to accommodate thermal expansion and contraction which may occur during use with fluctuations in temperature, while still maintaining an effective mechanical joint. In other words, the design compensates for and provides space for variations in sizes at the interconnection including changes in height, length, thickness, volume, and other dimensions. Other automotive components include a pulley assembly for an automotive accessory drive system, a brake drum, and a transmission gear, to name but a few.

Furthermore, as used herein, the terms axially, radially, and circumferentially refer to directions relative to the generally circular shape of the brake rotor 10, so that the radial direction extends generally along any one of the imaginary radii of the circular shape, the axial direction is generally parallel to a center axis of the circular shape, and the circumferential direction extends generally along any one of the imaginary circumferences of the circular shape.

Figure 1:
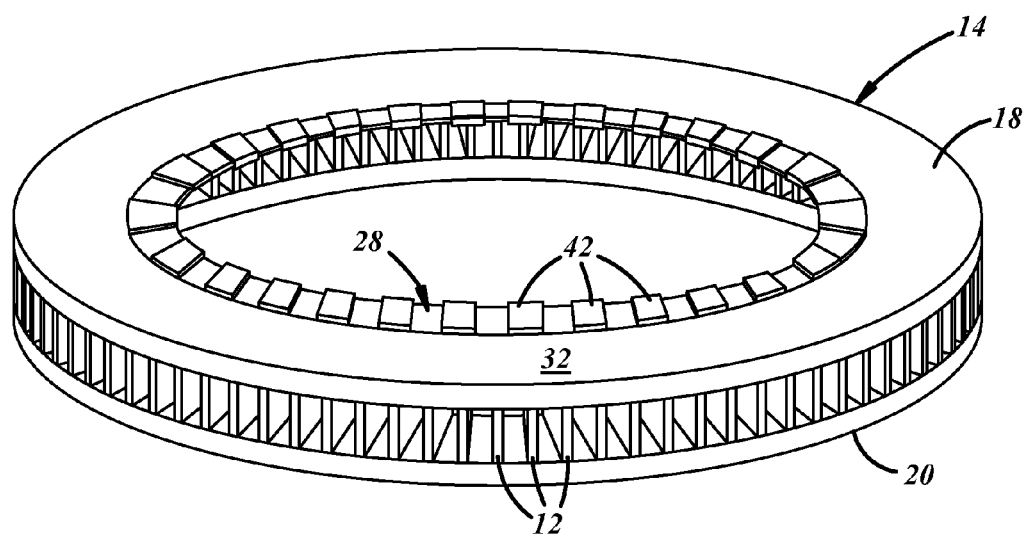
FIG. 1 is a perspective view of one embodiment of a cheek portion.
Figure 2:
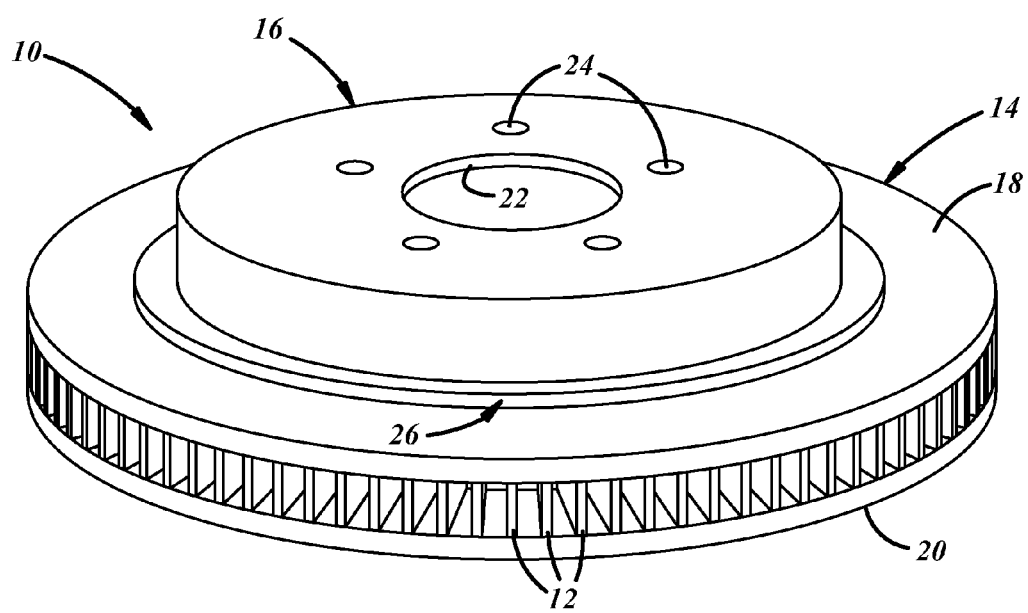
FIG. 2 is perspective view of one embodiment of a brake rotor having the cheek portion of FIG. 1.

The brake rotor 10 may be of the vented-type having a number of vanes 12 as shown, may be of the solid-type (not shown), or may be another type. Referring to FIGS. 1 and 2, the brake rotor 10 may include a cheek portion 14 and a hub portion 16. The cheek portion 14 may include a first cheek face 18 and an opposite second cheek face 20 that together constitute braking or friction surfaces of the brake rotor 10 that come into contact with a braking pad (not shown) during a braking event. The hub portion 16 may be used to mount the brake rotor 10 to an associated vehicle and may have a central aperture 22 and a number of bolt holes 24.

In this embodiment, the cheek portion 14 and the hub portion 16 may be made out of different materials to, among other things, reduce weight in the brake rotor 10. For example, the cheek portion 14 may be made out of a cast iron such as grey iron, and the hub portion 16 may be made out of aluminum, such as aluminum alloy 356, or magnesium such as a magnesium alloy. The cheek and hub portions 14, 16 may be mechanically joined together by an interconnection 26 created by portions of the cheek and hub portions that are fitted together during the cast-in-place process as will be described below in detail. In the example shown, a first flange 28 of the cheek portion 14 and a second flange 30 of the hub portion 16 form the interconnection 26 that holds the cheek and hub portions together.

Figure 3:
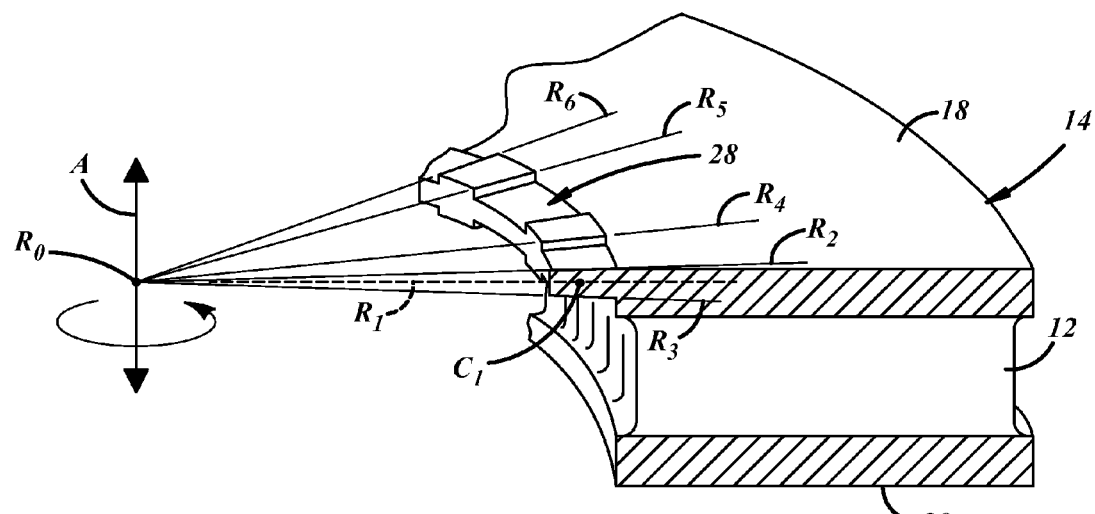
FIG. 3 is a sectioned and segmented view of the cheek portion of FIG. 1.
Figure 4:
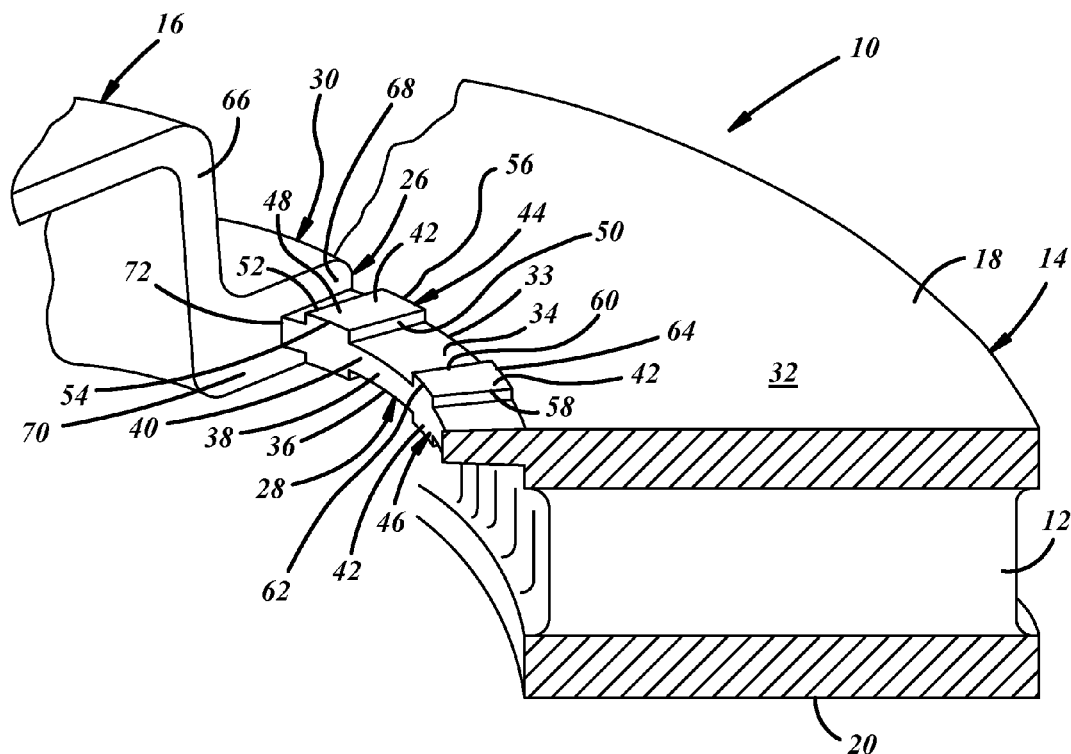
FIG. 4 is a sectioned and segmented view of the brake rotor of FIG. 2.

The first flange 28 may protrude radially inwardly and away from a body 32 of the cheek portion 14. Referring to FIG. 1, the first flange 28 may extend circumferentially continuous around the body 32 on the side of the first cheek face 18 as shown, or on the side of the second cheek face 20 (not shown). Referring now to FIGS. 3 and 4, the first flange 28 and the body 32 may be one-piece. The first flange 28 begins at a proximal end 33, has an upper surface 34 that may be planar, has a lower surface 36 that may be planar, may have an inner surface 38, and terminates at a distal or free end 40. As shown in cross-section, the first flange 28 may taper in axial height toward the free end 40 and radially inwardly toward an axis of rotation A about which the brake rotor 10 rotates during use. In other words, the first flange 28 may grow thinner toward the free end 40. Referring to FIG. 3, the upper surface 34 and the lower surface 36 may be angled toward each other such that they intersect at an imaginary reference point $R_0$ which is defined by a perpendicular intersection of the axis of rotation A and an imaginary radial line $R_1$ which goes through an axial centerpoint $C_1$ of the first flange 28. Put differently, an imaginary upper radial line $R_2$ lying along the upper surface 34 and an imaginary lower radial line $R_3$ lying along the lower surface 36 may converge at the reference point $R_0$. The first flange 28 may also include a number of ribs 42.

Referring to FIGS. 3 and 4, the ribs 42 may have a first set of ribs 44 that protrude from the upper surface 34, may have a second set of ribs 46 that protrude from the lower surface 36, or may have both sets of ribs. The ribs 42 may be spaced apart from one another on each surface, and may be equally spaced apart as shown, though they may be randomly staggered and unequally spaced on each surface. In the example, the first set of ribs 44 and the second set of ribs 46 oppose one another such that each rib in the first set is axially aligned with a rib from the second set, though the ribs in each set may be randomly spaced and unaligned with respect to each other. Each rib 42 may be coextensive with the first flange 28 such that each rib extends from the proximal end 33 to the free end 40, though each rib need not necessarily be coextensive. Each rib 42 may have a top surface 48 that may be planar, may have a first side surface 50 that may be planar, may have a second side surface 52 that may be planar, may have an inboard surface 54 that may be planar, and may have an outboard surface 56 that may be planar. The first and second side surfaces 50 and 52 may intersect the respective upper and lower surface 34, 36 at a 90° angle, or at an obtuse angle. Each rib 42 may also have a first circumferential edge 58, a second circumferential edge 60, a first radial edge 62, and a second radial edge 64.

Like the first flange 28, each rib 42 may taper in axial height toward the free end 40 and radially inwardly toward the axis of rotation A. Referring to FIG. 3 and taking a rib 42 on the upper surface 34 as an example, the top surface 48 may be angled toward the upper surface such that they intersect at the reference point $R_0$. Put differently, an imaginary rib radial line $R_4$ lying along the top surface 48 may converge with the upper radial line $R_2$ at the reference point $R_0$. Each rib 42 on the lower surface 36 may taper in axial height in a similar way. Each rib 42 may also taper in circumferential thickness toward the free end 40 and radially inwardly toward the axis of rotation A. Taking a rib 42 on the upper surface 34 as an example, the first side surface 50 and the second side surface 52 may be angled toward one another such that they intersect at the reference point $R_0$. Put differently, an imaginary first edge radial line $R_5$ lying along the first circumferential edge 58 may converge with an imaginary second edge radial line $R_6$ lying along the second circumferential edge 60 at the reference point $R_0$. Each rib 42 on the lower surface 36 may taper in circumferential thickness in a similar way.

Once formed, the second flange 30 may entirely enclose the first flange 28 and may enclose all of the ribs 42. In other embodiments, the second flange 30 need not necessarily enclose all of the first flange 28 or all of the ribs 42 in order to form a proper interconnection, and instead may enclose a portion of the first flange and a portion of the ribs. Referring to FIG. 4, the second flange 30 may protrude radially outwardly and away from a body 66 of the hub portion 16. The second flange 30 may have an upper second flange portion 68 that encloses the first set of ribs 44, and may have a lower second flange portion 70 that encloses the second set of ribs 46. In other embodiments, the second flange 30 may be located and orientated differently on the hub portion 16 than shown, such as midway along the axial extent of the body 66.

One exemplary embodiment of a method of making the brake rotor 10 may include several steps including a so-called cast-in-place process whereby the second flange 30 is cast-around the first flange 28. For example, the cheek portion 14 may be initially made by a casting process, a machining process, a forging process, a combination thereof, or another suitable metalworking process. The first flange 28 or select portions thereof may be coated with a ceramic spray, or other suitable material and/or process, to help prevent a metallurgical bonding between the materials of the first flange and the second flange 30. The cheek portion 14 may then be placed, manually or automatically, in a first cavity of a first molding machine half. The first cavity may resemble the shape of the cheek portion and may also resemble the shape of a part of the hub portion 16. In an example where cast iron is used for the cheek portion 14, the cheek portion and the first cavity may be maintained at a temperature of about 850° F. Once placed in the first cavity, the first molding machine half and an opposing second molding machine half may be brought together under force and may be sealed to form a cavity that may resemble the shape of the hub portion 16. The cavity may then be filled, such as by injection, with a molten material such as a molten aluminum or a molten magnesium. Upon cooling and solidification, the second flange 30 may envelope the first flange 28 and may envelope the ribs 42 to form the interconnection 26. The cheek portion 14 and the hub portion 16 are thus mechanically joined so that the portions do not substantially move or rotate relative to each other.

Furthermore, upon complete solidification, a gap 72 may be formed at the interconnection 26 as a result of the different temperatures of the different materials during formation and subsequent cooling. The gap 72 may develop between the first flange 28 and the second flange 30 such as between the inner surface 38 and the opposing surface of the second flange, between the upper surface 34 and the opposing surface of the upper second flange portion 68, between the lower surface 36 and the opposing surface of the lower second flange portion 70, between the ribs 42 and the corresponding opposing surfaces, or between all of these surfaces.

In a braking event, the cheek portion 14 and the hub portion 16 can become heated and can thermally expand as a response. Though the cheek portion 14 may become hotter in some cases, the particular material of the hub portion 16 (e.g., aluminum, magnesium) may have a greater coefficient of thermal expansion and thus may expand to a similar extent or more than the cheek portion. Conversely, after use and in cold weather, the cheek portion 14 and the hub portion 16 can become cooled and can thermally contract as a response. In each instance, the interconnection 26 accommodates the variations in sizes that follow fluctuations in temperature while still maintaining an effective mechanical joint between the cheek portion 14 and the hub portion 16. For example, the gap 72 may provide space for thermal expansion so that the cheek and hub portions 14, 16 do not constrain relative expansion and thus do not deform. As another example, the geometry of the first flange 28 and that of the ribs 42 may accommodate thermal expansion and contraction. Namely, the various tapers and imaginary planes and lines crossing at the common reference point $R_0$ as described above may accommodate thermal expansion and contraction by permitting expansion and contraction therealong.

The above description of embodiments of the invention is merely exemplary in nature and, thus, variations thereof are not to be regarded as a departure from the spirit and scope of the invention.

What is claimed is:

1. A product comprising:
  a first component portion comprising a first material and having a flange protruding away from a body of the first component portion, terminating at a free end, and being tapered in height toward the free end, the flange having a plurality of ribs located on a surface of the flange and spaced apart from one another on the surface, each of the plurality of ribs taper in height toward the free end and taper in thickness toward the free end; and
  a second component portion comprising a second material different than the first material, the second component portion having a portion cast-in-place over at least part of the flange and over the plurality of ribs to form an interconnection between the first and second component portions so that relative movement between the first and second component portions is substantially prevented;
  wherein thermal expansion and contraction of the first and second component portions at the interconnection during use of the product is accommodated by the flange and the plurality of ribs.

2. A product as set forth in claim 1 further comprising a gap defined between an inner surface of the flange and an opposing surface of the second component portion constructed and arranged to accommodate thermal expansion and contraction at the interconnection.

3. A product as set forth in claim 1 wherein each of the plurality of ribs are coextensive in length with the flange so that the ribs extend from a proximal end of the flange to the free end.

4. A product as set forth in claim 1 wherein the first component portion is a cheek portion of a brake rotor and the second component portion is a hub portion of the brake rotor.

5. A product as set forth in claim 1 wherein the first material comprises a cast iron and the second material comprises at least one of aluminum or magnesium.

6. A product as set forth in claim 1 wherein the plurality of ribs includes a first set of ribs located on an upper surface of the flange and a second set of ribs located oppositely on a lower surface of the flange.

7. A product as set forth in claim 1 wherein the flange has an upper surface that is planar and each of the plurality of ribs includes a planar top surface, a planar first side surface, and a planar second side surface, all of which accommodate thermal expansion and contraction at the interconnection.

8. A product comprising:
  a brake rotor comprising:
    a cheek portion comprising a first material and having a first flange extending away from a cheek face of the cheek portion toward an axis of rotation of the brake rotor and being tapered in axial height toward the axis of rotation, the first flange having a plurality of ribs located on a surface of the first flange, being circumferentially spaced apart from one another, each being tapered in axial height toward the axis of rotation, and each being tapered in circumferential thickness toward the axis of rotation; and
    a hub portion comprising a second material different than the first material, the hub portion having a second flange cast-in-place over at least part of the first flange and over the plurality of ribs to form an interconnection between the cheek and hub portions so that relative rotational movement between the cheek and hub portions is substantially prevented;
  wherein thermal expansion and contraction of the cheek and hub portions at the interconnection during use of the brake rotor is accommodated by the first flange and the plurality of ribs.

9. A product as set forth in claim 8 wherein the first material comprises a cast iron and the second material comprises at least one of aluminum or magnesium.

10. A product as set forth in claim 8 further comprising a gap defined between an inner surface of the first flange and an opposing surface of the second flange constructed and arranged to accommodate thermal expansion and contraction at the interconnection.

11. A product as set forth in claim 10 wherein each of the plurality of ribs are coextensive in radial length with the first flange whereby the ribs extend from a proximal end of the first flange to a free end of the first flange.

12. A product as set forth in claim 11 wherein the plurality of ribs includes a first set of ribs located on an upper surface of the first flange and a second set of ribs located oppositely on a lower surface of the first flange.

13. A product as set forth in claim 12 wherein the first flange extends circumferentially continuous around the cheek face.

14. A product as set forth in claim 8 wherein the first flange tapers in axial height toward the axis of rotation so that an imaginary upper radial line lying along an upper planar surface of the first flange converges with an imaginary lower radial line lying along a lower planar surface of the first flange at a reference point defined by a perpendicular intersection of the axis of rotation with an imaginary radial line going through an axial centerpoint of the first flange.

15. A product as set forth in claim 14 wherein each of the plurality of ribs taper in axial height toward the axis of rotation so that an imaginary rib radial line lying along a top planar surface of a single rib converges with the imaginary upper radial line at the reference point.

16. A product as set forth in claim 15 wherein each of the plurality of ribs taper in circumferential thickness toward the axis of rotation so that an imaginary first edge radial line lying along a first circumferential edge of a single rib converges with an imaginary second edge radial line lying along a second circumferential edge of the single rib at the reference point.

17. A product as set forth in claim 8 wherein the surface is planar and each of the plurality of ribs includes a planar top surface, a planar first side surface, and a planar second side surface, all of which accommodate thermal expansion and contraction at the interconnection.

18. A method of making a product, the method comprising:
providing a cheek portion of a brake rotor, the cheek portion being comprised of a first material and having a first flange extending away from a cheek face of the cheek portion toward an axis of rotation of the cheek portion and being tapered in axial height toward the axis of rotation, the first flange having a plurality of ribs located on a surface of the first flange, being circumferentially spaced apart from one another, each being tapered in axial height toward the axis of rotation, and each being tapered in circumferential thickness toward the axis of rotation;
placing the cheek portion in a first cavity of a first molding machine half;
bringing the first molding machine half and a second molding machine half together to form a cavity; and
filling the cavity with a molten second material different than the first material so that, when solidified, the second material forms a hub portion of the brake rotor, the hub portion having a second flange formed around at least part of the first flange and around the plurality of ribs to create an interconnection between the cheek and hub portions so that relative rotational movement between the cheek and hub portions is substantially prevented.

19. A method as set forth in claim 18 wherein the first material comprises a cast iron at a temperature of about 850° F. when placed in the first cavity, and wherein the second material comprises an aluminum at a temperature of about 1,425° F. when filled in the cavity.

\* \* \* \* \*